United States Patent
Uesaka et al.

(10) Patent No.: US 8,009,028 B2
(45) Date of Patent: Aug. 30, 2011

(54) SYSTEM FOR RECOMMENDING MAINTENANCE FOR FUEL ECONOMY IMPROVEMENT

(75) Inventors: Hiroto Uesaka, West Bloomfield, MI (US); Tomoaki Tanaka, Novi, MI (US); Michael Wiegand, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 359 days.

(21) Appl. No.: 12/284,386

(22) Filed: Sep. 22, 2008

(65) Prior Publication Data

US 2010/0073158 A1 Mar. 25, 2010

(51) Int. Cl.
*B60Q 1/00* (2006.01)
*G06F 19/00* (2011.01)
*G06G 7/70* (2006.01)
*G05D 17/00* (2006.01)

(52) U.S. Cl. ............ 340/450.2; 340/461; 340/459; 340/438; 340/439; 340/691.6; 340/442

(58) Field of Classification Search .......... 340/450.2, 340/461; 701/123
See application file for complete search history.

(56) References Cited

U.S. PATENT DOCUMENTS

| 5,487,002 | A | * | 1/1996 | Diller et al. ............... 701/1 |
| 5,587,698 | A | | 12/1996 | Genna |
| 5,775,406 | A | * | 7/1998 | Ghitea, Jr. .............. 165/11.1 |
| 6,278,363 | B1 | | 8/2001 | Bezek et al. |
| 6,434,450 | B1 | * | 8/2002 | Griffin et al. ............. 701/1 |
| 6,504,474 | B1 | | 1/2003 | Goodnight et al. |
| 2006/0202811 | A1 | | 9/2006 | Taguchi |
| 2008/0133120 | A1 | * | 6/2008 | Romanick ............. 701/123 |
| 2008/0270016 | A1 | * | 10/2008 | Proietty et al. .......... 701/123 |

FOREIGN PATENT DOCUMENTS

JP 2006-232130 9/2006

* cited by examiner

*Primary Examiner* — Donnie Crosland
(74) *Attorney, Agent, or Firm* — Harness, Dickey & Pierce, PLC

(57) ABSTRACT

A method of optimizing fuel economy and carbon dioxide emissions of a vehicle may entail utilizing an interior vehicle display to alert a driver as to the state of various vehicle components and parameters and their effect on fuel economy and carbon dioxide emissions. The components and parameters may be monitored by or direct information into a vehicle efficiency ECU which communicates with the display. The method may entail reading and displaying a real-time tire pressure into the efficiency ECU and displaying the corresponding fuel economy. a manufacturer's recommended tire pressure and corresponding fuel economy could also be displayed. The method may also entail reading a variety of real-time weather conditions into the efficiency ECU that correspond to a plurality of different road routes to a driver-selected destination. The fuel economy of each route may be displayed for driver selection to optimize fuel economy and carbon dioxide emissions.

24 Claims, 4 Drawing Sheets

SYSTEM FOR RECOMMENDING MAINTENANCE FOR FUEL ECONOMY IMPROVEMENT

FIELD

The present disclosure relates to a system for monitoring various vehicle parameters, monitoring various environmental factors, recommending and displaying changes to vehicle operation, and displaying effects of the recommended changes.

BACKGROUND

The statements in this section merely provide background information related to the present disclosure and may not constitute prior art. Some current automobiles are equipped with tire pressure monitoring systems ("TPMS") that indicate to a driver vehicle tire(s) having a pressure that has decreased below a predetermined pressure. Furthermore, some current automobiles are equipped with a navigation system that displays a map to a vehicle driver of the roadways currently surrounding the vehicle location.

A limitation of current TPMS and navigation systems is that such systems are separate systems within a vehicle and do not communicate or interact with each other. Another limitation is that current TPMS do not indicate to a driver the current tire pressure nor do they recommend the optimal tire pressure or the tire manufacturer's recommended tire inflation pressure. Another limitation is that current TPMS and navigation systems do not indicate or display to the driver the new estimated miles per gallon ("mpg") based on the optimal or tire manufacturer's recommended tire pressure if the tires were inflated as such. Another limitation is that current TPMS and navigation systems do not calculate the amount of carbon dioxide or $CO_2$ that could be reduced per mile, if the optimal or recommended tire pressure were utilized.

Still yet, current TPMS and navigation systems do not calculate and indicate to a vehicle driver the amount of gas that will be consumed on a trip given the current vehicle conditions, environmental conditions, and road route anticipated, as entered into the vehicle navigation system. Furthermore, current TPMS and navigation systems will not recommend alternative routes based upon the current vehicle conditions and the prevailing environmental conditions of various potential routes as recommended by the navigation system. Moreover, current TPMS and navigation systems do not permit a user to select from a list of potential changes in vehicle conditions, environmental conditions, or various road routes and see a calculated list of vehicle gasoline use and vehicle $CO_2$ output based on the different possible combinations, even selected combinations, of such vehicle conditions, environmental conditions and various road routes.

SUMMARY

A method of optimizing fuel economy and carbon dioxide emissions of a vehicle employing an internal combustion engine may be performed by utilizing an efficiency electronic control unit ("ECU"). The method may entail reading a real-time tire pressure into the efficiency ECU, reading a number of real-time weather conditions into the efficiency ECU with each weather condition corresponding to a particular road route to the same destination. Furthermore, the method may entail displaying the real-time tire pressure and corresponding fuel economy on a driver-readable display within the vehicle compartment, and displaying all of the real-time weather conditions for the variety of road routes to the destination and their corresponding fuel economies. Continuing the method may involve displaying a fuel economy of the vehicle using a manufacturer recommended tire pressure and providing user-selectable options on the display for a driver to select one of the road routes and its corresponding fuel economy, and to select the real-time tire pressure and its corresponding fuel economy and the fuel economy of the vehicle using the manufacturer recommended tire pressure to display the lowest possible fuel economy.

Numerous other aspects may be monitored or considered in order to maximize vehicle fuel economy or minimize carbon dioxide emissions. For instance, the method may entail reading a plurality of real-time traffic conditions into the efficiency ECU corresponding to a plurality of road routes to the destination, and displaying a fuel economy of the vehicle for each of the plurality of road routes. Moreover, reading a real-time electrical load into the efficiency ECU, and displaying the electrical load on the display and an amount of fuel use attributed to the electrical load may be accomplished. Still yet, the method may include reading a real-time transmission gear position from a transmission ECU and into the efficiency ECU, and displaying a fuel economy of the vehicle based upon the real-time transmission gear position and for different transmission gear positions at a current vehicle speed; also, reading real-time positions of a plurality of load balancers into the efficiency ECU, displaying a fuel economy of the vehicle based upon the real-time positions of the plurality of load balancers and for no load positions of the balancers of the vehicle, and providing a touch screen option to adjust the load balancers to their no load positions.

Furthermore, reading real-time information from a brake ECU into the efficiency ECU, and directing rotational energy from vehicle wheels to electrical generators may be included in the method. Moreover, generating electrical energy with the electrical generators, supplying electricity to the electrical loads of the vehicle, disengaging a vehicle alternator, and displaying, on the display, a fuel economy before generating electrical energy with the electrical generators and a fuel economy after generating electrical energy with the electrical generators may be included.

The method may include communicating with an engine ECU. More specifically, reading real-time engine ECU parameters into the efficiency ECU and displaying a fuel economy of the vehicle based upon the real-time engine ECU parameters and displaying a fuel economy of the vehicle based upon proposed changes in the engine ECU parameters. The engine ECU parameters may include a quantity of fuel injected into each combustion cylinder, an ignition timing for each cylinder, and a level of boost maintained by a turbocharger. The method may also include reading an air conditioning evaporator temperature into the efficiency ECU, and displaying a fuel economy of the vehicle for each of a plurality of lesser air conditioning compressor displacements on the display, each displacement corresponding to the same evaporator temperature. Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
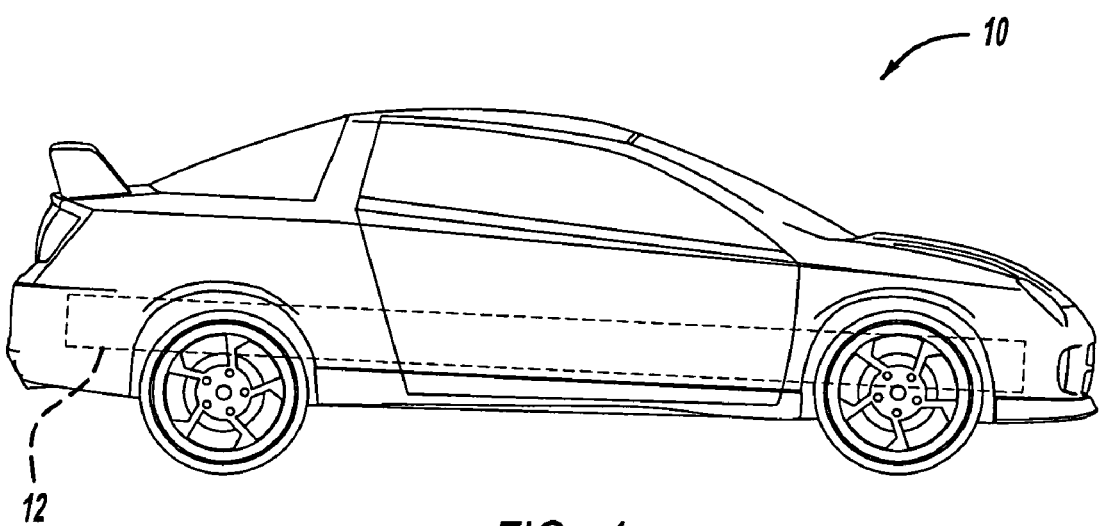
FIG. 1 is a side view of a vehicle depicting the locations of a tire pressure monitoring system and a navigation system.

The following description is merely exemplary in nature and is not intended to limit the present disclosure, application, or uses. With general reference to FIGS. 1-6, the teachings of the present disclosure will be presented. More specifically, with initial reference to FIGS. 1-3, a fuel efficiency optimization-displaying device and a carbon dioxide optimization-displaying device according to an embodiment of the present invention will be described. The rightward direction and the leftward direction in FIGS. 1-3 correspond to the frontward direction and the backward direction, respectively, of a vehicle 10.

Figure 3:
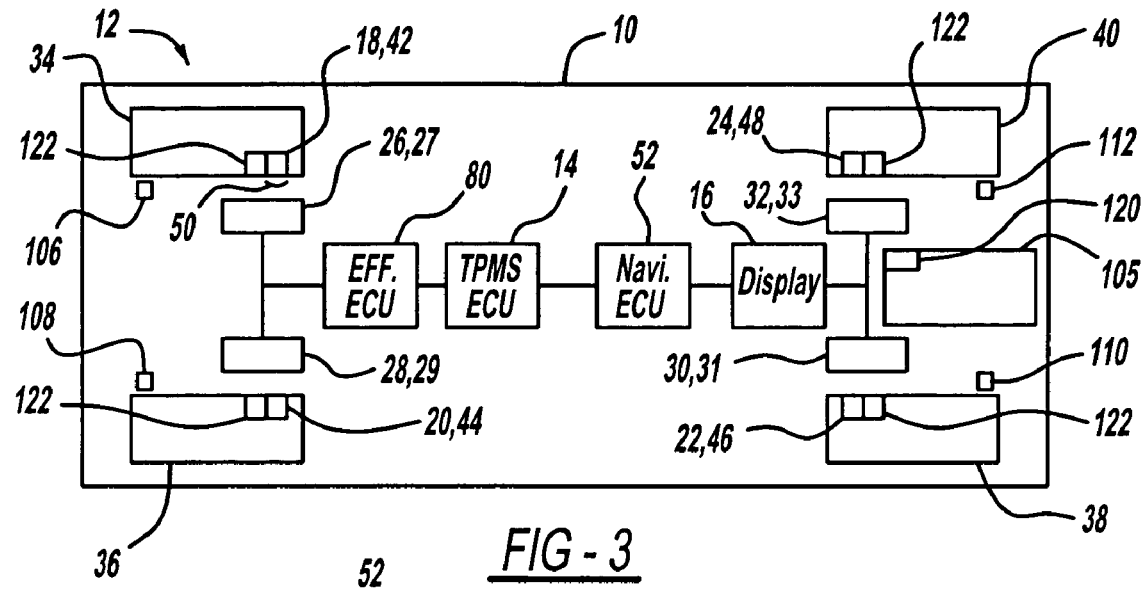
FIG. 3 is a diagram depicting components of a tire pressure monitoring system and a navigation system.

In accordance with FIG. 3, a tire pressure monitoring system ("TPMS") 12 is resident within the vehicle 10 and employs a TPMS ECU 14 to receive, process and output information on a display 16. More specifically, the TPMS 12 is mounted in the vehicle 10 and includes a first transmitter 18, a second transmitter 20, a third transmitter 22, and a fourth transmitter 24. The transmitters 18, 20, 22, 24 each correspond, respectively, to a first receiver 26, a second receiver 28, a third receiver 30, and a fourth receiver 32.

The transmitters 18, 20, 22, 24 are provided at, on, or within a first wheel 34, a second wheel 36, a third wheel 38, and a fourth wheel 40, respectively. Furthermore, the transmitters 18, 20, 22, 24 each contain a corresponding sensor, such as a first sensor 42, second sensor 44, third sensor 46, and fourth sensor 48 to detect or sense an air pressure within a tire at each of the corresponding wheels 34, 36, 38, 40. The detected pressure is placed into a data packet indicating the detected tire air pressure and transmitted as a signal 50 to the respective receiver 26, 28, 30, 32. The signal 50 is represented at the first wheel 34 and is the same or similar in operation to the other wheels 36, 38, 40 of the vehicle 10. Each of the transmitters 18, 20, 22, 24, in addition to the sensors 42, 44, 46, 48, includes an antenna (not depicted) and a microcomputer to process the signal 50.

Alternatively, the receivers 26, 28, 30, 32 may instead be antennas 27, 29, 31, 33 that, respectively, receive a signal from the transmitters 18, 20, 22, 24, the signal then being processed. Regardless, the signal 50 transmitted from the transmitters 18, 20, 22, 24 may be sent to the TPMS ECU 14 so that the tire pressure sensed for each respective wheel 34, 36, 38, 40 may be displayed on the display 16. A microcomputer, as part of the TPMS ECU 14 processes and calculates received data from the transmitters and displays a tire air pressure for each tire of each wheel and outputs the pressure to the display 16 for observation by a vehicle driver. More specifically, the TPMS ECU 14 makes a determination whether the sensed and displayed tire air pressure is within a low pressure range by determining whether the specified tire air pressure is below a predetermined pressure threshold "PTH." If the determination is affirmative, the TPMS ECU 14 outputs to the display 16 a signal indicating the affirmative determination. Thus, the display 16 receives information indicating that a tire air pressure of one of the wheels 34, 36, 38, 40 has decreased. The TPMS ECU 14 also specifies, according to the specified tire air pressure, a degree of shortage of the tire air pressure compared to an appropriate tire air pressure. The TPMS ECU 14 further specifies, according to the specified tire air pressure, an amount of degradation of fuel economy in the case that the vehicle travels at the sensed and displayed tire air pressure, compared to the fuel economy in the case that the vehicle travels at the appropriate tire air pressure.

The amount of the fuel economy degradation can be obtained according to a tabulated relationship between the tire air pressure and the amount of fuel economy degradation. In other words, the fuel economy for a vehicle may be obtained from a look up table created with the tires at a variety of pressures that are below the threshold pressure. The table may be created such that from one up to four tires are at specific air pressures. Stated differently, the vehicle tires may be filled with know air pressures in all combinations of pressures at the prescribed or correct tire pressure down to a certain tire pressure below the prescribed or correct tire pressure.

As an example, assuming the appropriate or correct tire pressure is assumed to be 35 pounds per square inch ("psi") for all four tires of a typical vehicle, and the vehicle is capable of obtaining 30 miles per gallon ("mpg") with the tires inflated at such a pressure, a decrease in tire pressure at just one of the tires to 25 psi may result in a fuel economy of 29 mpg. In such a scenario, the TPMS ECU 14 would display the tire pressure and location of the tire that is at 25 psi. Additionally, the expected fuel economy of 29 mpg, optimum fuel economy of 30 mpg, and difference of 1 mpg would also be displayed. By displaying not only the degraded fuel economy of 1 mpg, but also which tire is suffering from a pressure less than optimal pressure, the driver of the vehicle may choose to correct the problem and inflate the tire with 25 psi to 35 psi. By displaying the fuel economy degradation amount and the decreased and correct pressures on the display 16, a vehicle driver is provided with extra incentive to correct the problem. The decision to display the decreased tire pressure in any or all vehicle tires may be based on a selected threshold pressure. For the example provided above, such a pressure may be 34.5 psi, 34 psi, or any such pressure below the prescribed or correct pressure of 35 psi. Such a prescribed threshold pressure may be set using the navigation ECU 52, which may be controlled using navigation controls, which may be touch-screen controls on the display 16. That is, the navigation ECU 52 and the TPMS ECU 14 may communicate with each other at least to the extent that a threshold pressure may be input for the tires.

In addition to displaying a current decrease in mpg fuel economy, and the potential improvement in fuel economy in mpg, if a tire suffering from decreased or below normal pressure is present, the TPMS ECU 14 may also display a carbon dioxide ($CO_2$) savings per mile if the tire with the decreased pressure of 25 psi is inflated to its proper pressure of 35 psi. That is, for each gallon of fuel, such as gasoline or diesel fuel burned, there is an associated discharge of carbon dioxide ($CO_2$). More specifically, according to the Environmental Protection Agency ("EPA"), the Intergovernmental Panel on Climate Change ("IPCC") guidelines for calculating emissions inventories require that an oxidation factor be applied to the carbon content to account for a small portion of the fuel that is not oxidized into $CO_2$. Accordingly, for all oil and oil products, the oxidation factor used is 0.99 with the remaining 0.01 representing the 1 percent that does not oxidize. The Code of Federal Regulations (40 CFR 600.113) provides values for carbon content per gallon of gasoline and diesel fuel which the EPA uses in calculating the fuel economy of vehicles: Gasoline carbon content per gallon: 2,421 grams, and Diesel carbon content per gallon: 2,778 grams.

To calculate the $CO_2$ emissions from a gallon of fuel, the carbon emissions are multiplied by the ratio of the molecular weight of $CO_2$ (m.w. 44) to the molecular weight of carbon (m.w.12): 44/12. $CO_2$ emissions from a gallon of gasoline=2,421 grams×0.99×(44/12)=8,788 grams=8.8 kg/gallon=19.4 pounds/gallon. $CO_2$ emissions from a gallon of diesel=2,778 grams×0.99×(44/12)=10,084 grams=10.1 kg/gallon=22.2 pounds/gallon. Continuing, if one performs the calculations related to the extra fuel that cars consume due to under-inflated tires, consider the Environmental Protection Agency standard that a 1% loss of fuel efficiency occurs for every 2 psi of air under the maximum recommended tire pressure level. Additionally, a 2003 Department of Energy report states that vehicles average 22.3 miles per gallon and 12,242 miles traveled per year, and you find that cars may burn an extra 144 gallons of gasoline due to under-inflated tires. At $4 per gallon of fuel, each car owner is spending an additional $576 for gasoline each year.

Figure 2:
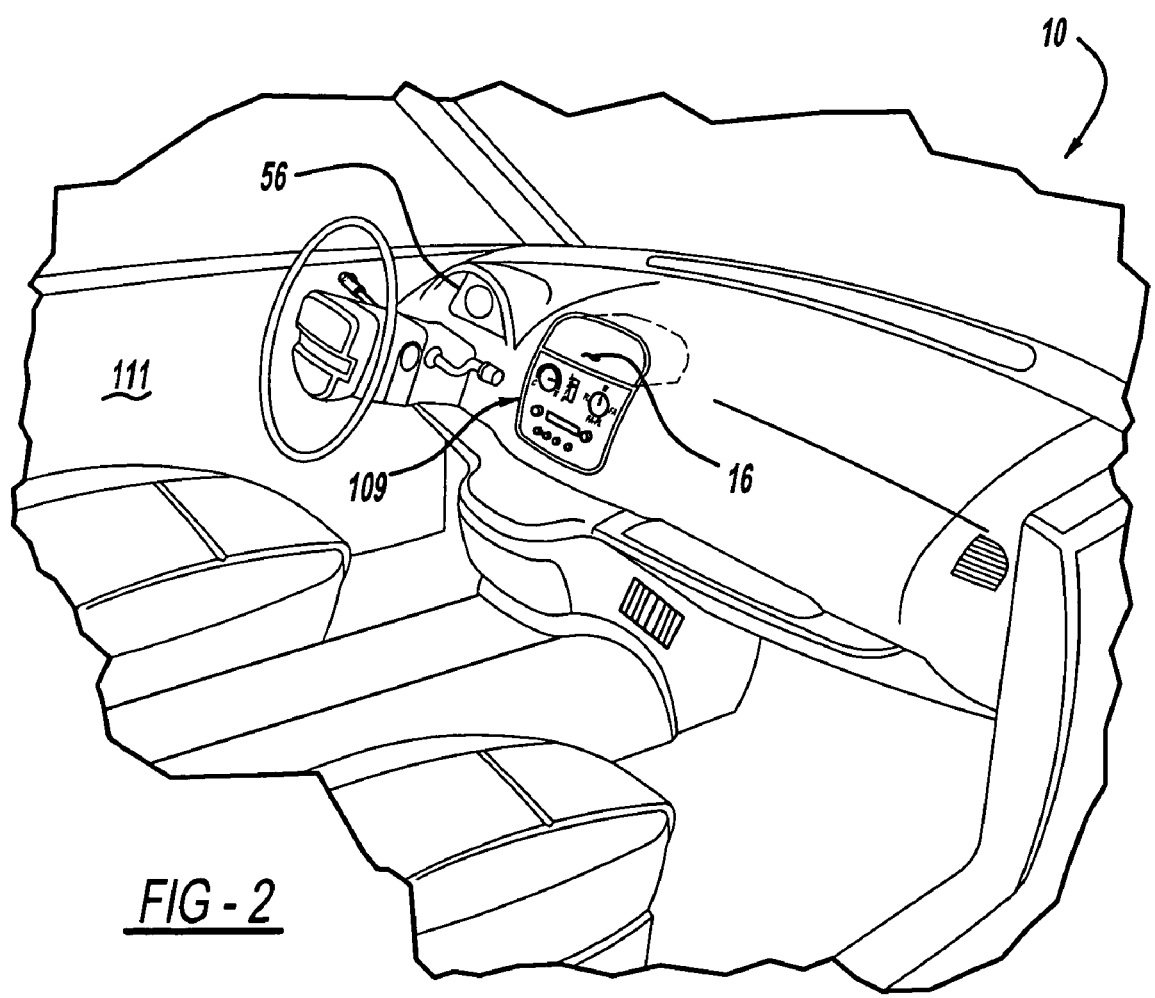
FIG. 2 is a perspective view of a vehicle interior depicting the location of a navigation system and a navigation system display.

As depicted in FIG. 2, the display 16 may located at a place where a driver can readily see it, such as part of an instrument panel 56, and may include, for example, a screen such as liquid crystal. Alternatively, the display 16 may be part of the navigation system. When the display 16 receives signals from the TPMS ECU 14 indicating a decrease of the tire air pressure, the degree of the pressure deficiency, and the amount of the fuel efficiency degradation, it notifies the driver of such information in the received signals.

As depicted in FIG. 2, the display 16 displays together an image indicating the decrease of the tire air pressure and the amount of the fuel efficiency degradation. Therefore, the driver can recognize that the tire air pressure has decreased and, as a result, that the fuel efficiency has also decreased.

Figure 5:
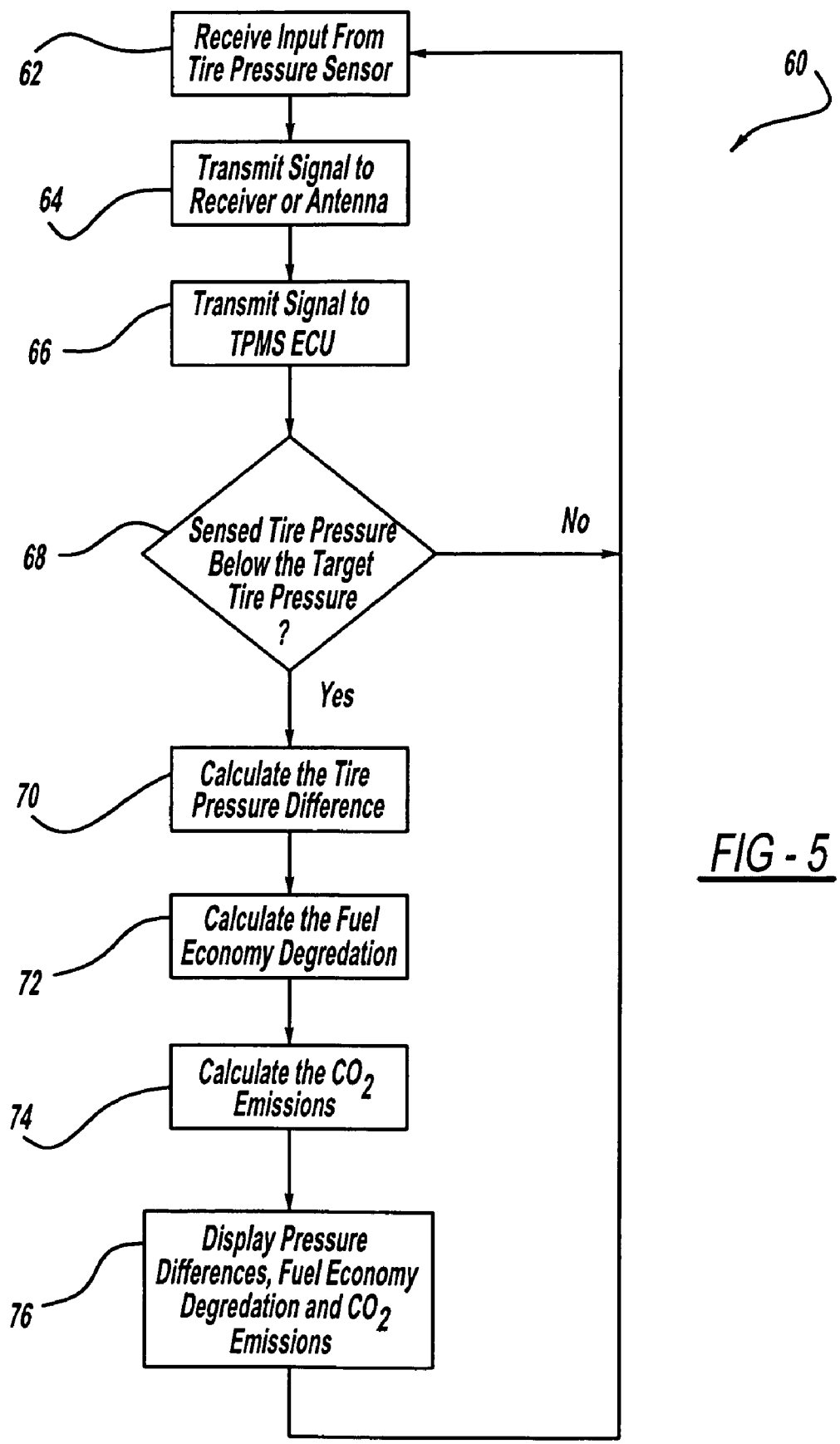
FIG. 5 is a flowchart depicting the display of fuel economy related to tire pressures.
Figure 6:
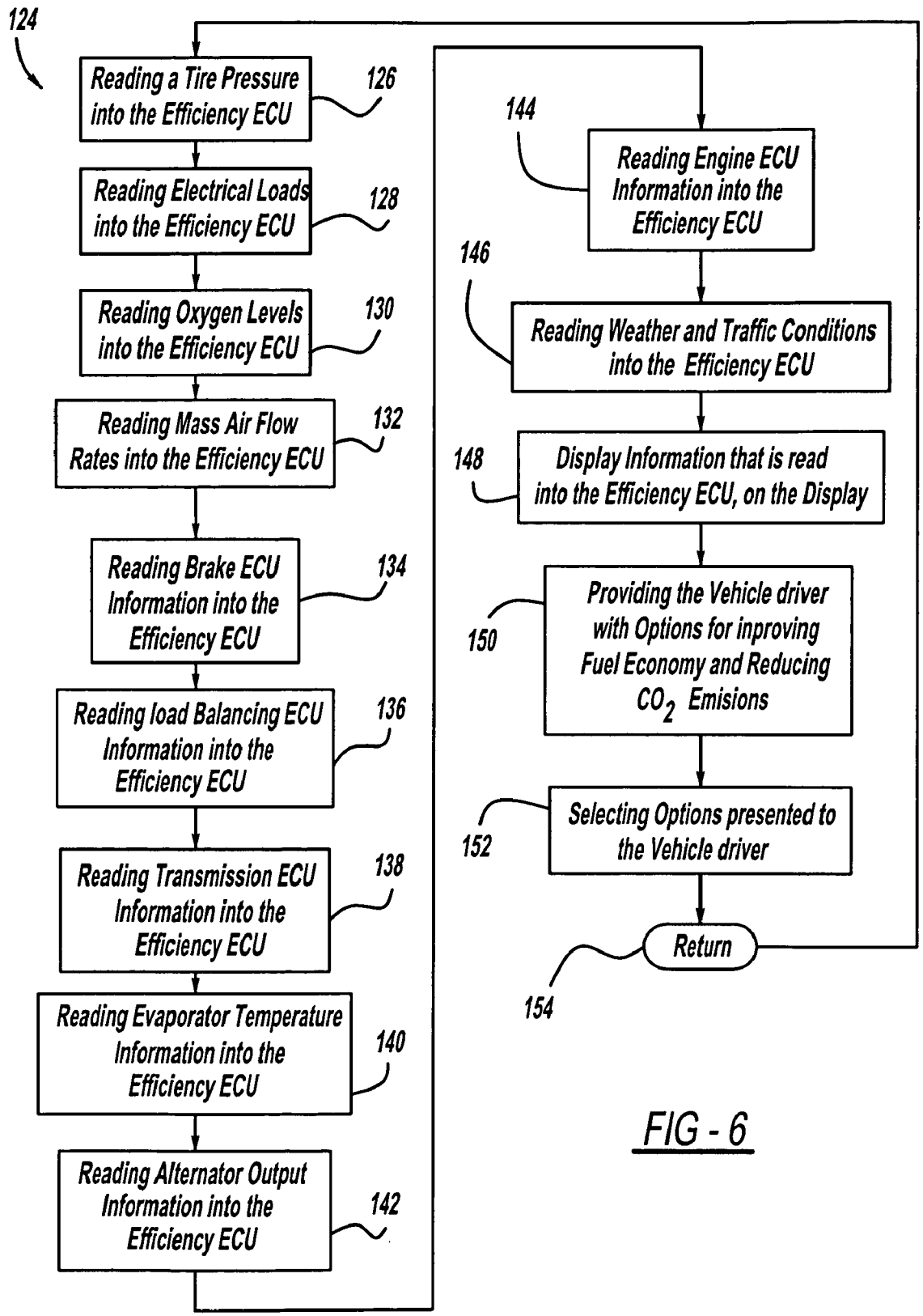
FIG. 6 is a flowchart depicting the display of options to a driver regarding various vehicle parameters and their effect on fuel economy and $CO_2$ emissions.

The operation of the tire pressure monitoring system will now be described in the flowchart 60 depicted in FIG. 5. The logic begins at block 62 when the tire pressure sensor 42 within the tire of the wheel 34 senses input from the surrounding air pressure. While the logic is applicable to each of the wheels of a vehicle, one wheel 34 will primarily be used in the logic of the following example. Proceeding to block 64, the signal 50 resulting from the sensed pressure at or within the wheel 34 is transmitted to its corresponding receiver 26. Alternatively, instead of a receiver 26, the signal 50 may be sent to an antenna 27. In either event, the signal 50 and its information (data packet) is sent to and received by the TPMS ECU 66. Upon the sensed pressure being received in the TPMS ECU 66, the logic proceeds to decision block 68 where the sensed pressure is compared to a target air pressure, such as a maximum air pressure, for the first wheel 34. If the sensed air pressure is not below the target air pressure, then the logic returns to block 62; however, if the sensed air pressure is below the target air pressure, then the logic continues to block 70.

In block 70, the sensed tire or air pressure is less than or below the target tire or air pressure and the difference between the pressures is calculated to arrive at the pressure difference. Next, at block 72, the fuel economy at the measured tire pressure and the target tire pressure is calculated, or looked up on a map, and then the difference in fuel economy in mpg is calculated. The difference between the fuel economy in mpg at the target tire pressure and the fuel economy at the measured fuel economy is the fuel economy degradation quantity. The logic then proceeds to block 74 where the carbon dioxide ($CO_2$) emissions are calculated. Such $CO_2$ exhaust emissions may be calculated in accordance with the guidelines outlined above, such as on the basis of each gallon of fuel (gasoline or diesel) combusted. Subsequently, at block 76, a variety of results may be displayed to the driver on the display 16. Examples of what may be displayed are: the target tire air pressure; the measured tire air pressure; the air pressure difference between the target tire air pressure and the measured tire air pressure; the fuel economy in mpg if the measured tire air pressure is maintained; the fuel economy in mpg if the target tire air pressure were used; the fuel economy degradation amount, which is the difference between the fuel economy of the vehicle when the target tire air pressure is utilized and the measured tire air pressure, which is less than the target tire air pressure. While the above exemplifies a possible scenario for a single vehicle tire or wheel 34, any number of vehicle tires or wheels may be taken into consideration, and the results displayed accordingly.

Thus, the amount of the fuel efficiency degradation caused by a tire air pressure being below a target, desired or maximum pressure is displayed on the display 16. The TPMS 12 displays or indicates not only a warning of the decrease of the tire air pressure for each and every vehicle wheel, but also the decrease in the fuel efficiency; therefore, the driver may clearly recognize the amount of the vehicle mpg degradation or decrease. As a result, it is possible to prevent the vehicle fuel economy from worsening because the driver can inflate or add air pressure to the tire or tires that are subject to a level of pressure below the target or appropriate pressure, according to the tire or vehicle manufacturer. Additionally, the display 16 displays the degree of the tire air pressure shortage compared to such appropriate tire air pressure. Therefore, the driver may recognize how much supplemental pressure is necessary to achieve the appropriate tire air pressure.

Regarding tire air pressure, there are essentially two basic ways to electronically monitor tire pressure. One is the direct method as described above, in which a pressure sensor is located inside each wheel (tire) and the sensor has a built-in transponder that broadcasts a radio signal to an external module. The module identifies the signal from each wheel and keeps an eye on pressure. If pressure drops below a predetermined threshold, the module turns on a light, displays a message, or actually displays the pressure to warn the driver. Pressure sensors attached to the rim drop center are typically held in place by a long steel strap that wraps around a periphery of the wheel. The pressure sensors may be very accurate, such as within 2 psi or less. Another method of monitoring tire pressure does not require any additional hardware inside or outside the wheel and is an indirect method. This approach makes use of the existing wheel speed sensors in the antilock brake (ABS) system. By modifying and utilizing the ABS operating software, the ABS system "learns" the average speed at which each wheel rotates when traveling straight at a constant velocity, and detects low tires by comparing relative wheel speeds. This approach is a simple, cost-effective way to monitor tire pressure; however, the system may not be able to detect a low tire if two tires on the same axle are low, or if all four tires are low by an equal amount. But it can detect one or more low tires if the rest of the tires are at or near the recommended inflation pressure.

In another aspect of the invention, various vehicle on-board components, and external devices communicate with one or more vehicle on-board components such as a vehicle efficiency ECU. Such communications may be used to improve vehicle fuel economy, which is one measure of the vehicle efficiency. More specifically, and with reference to FIG. 3, efficiency ECU 80 may be used to accept, process, and display information to a vehicle driver to instruct or assist the driver in improving the fuel economy of the vehicle 10. Continuing, devices that may communicate with the efficiency ECU 80 may be: a navigation system or navigation ECU 52, cell phone tower 82, satellite 84, TPMS ECU 14, large electrical load 86, oxygen sensor 88, mass air flow sensor 90, brake ECU 92, load balancing ECU 94, cluster 96, transmission ECU 98, A/C compressor 100, alternator ECU 102, and engine ECU 104.

Figure 4:
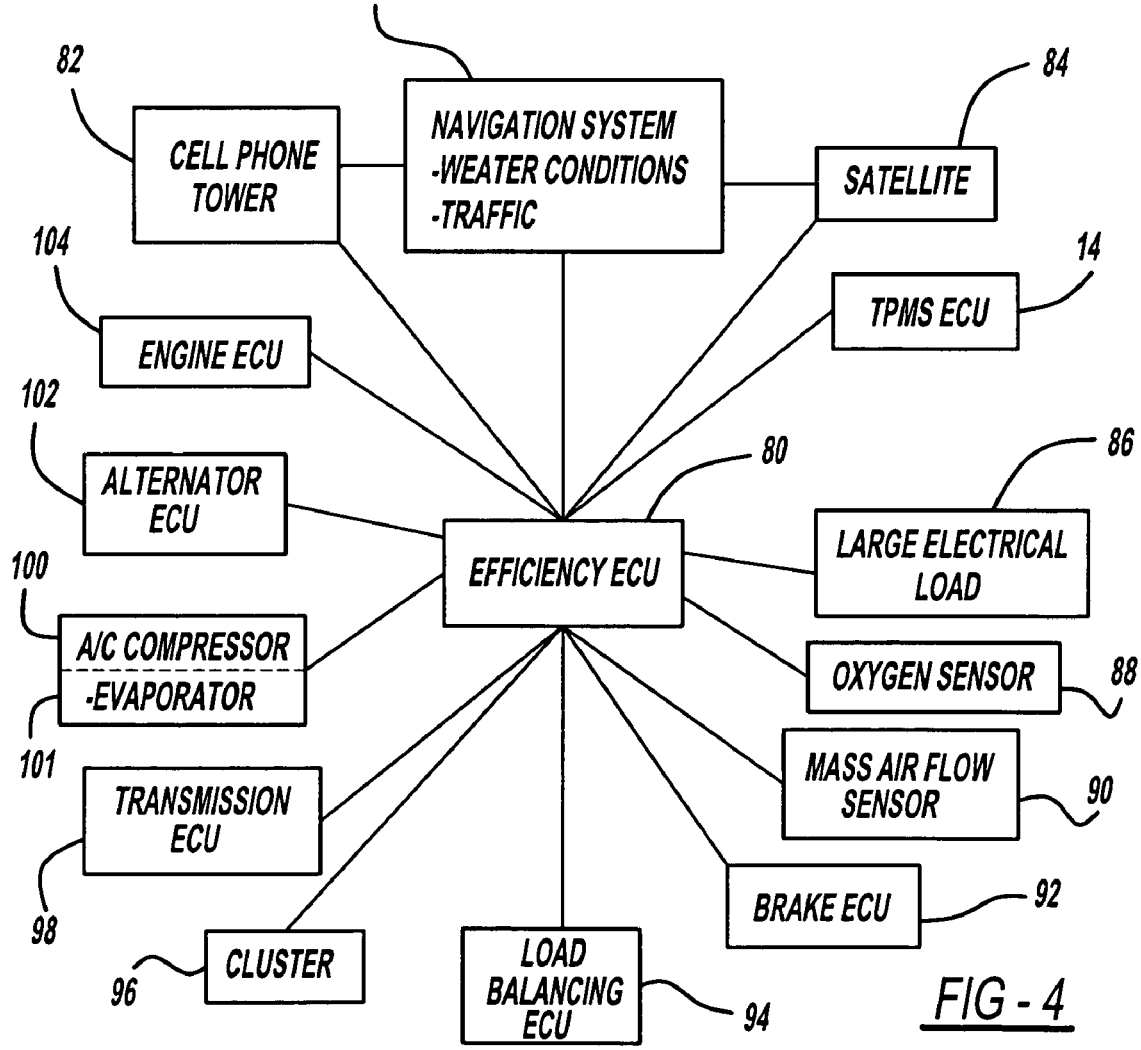
FIG. 4 is a diagram depicting the input and processing components utilized in improving the fuel economy of a vehicle.

Continuing with FIG. 4, the navigation system or navigation ECU 52 may communicate with one or more cell phone towers and/or one or more satellites 84 to receive weather information and display such weather information to the driver of the vehicle 10. Because the weather information is received by the navigation ECU 52, which also displays roads and highways along which the driver will drive the vehicle 10, the driver is provided the opportunity of changing his or her driving route to avoid the weather, which may be inclimate. Such inclimate weather may result in the driver in having to slow the vehicle to a speed, such as 10 mph, which may impact fuel economy, such as decreased mpg. In response to such, the driver may select a road route to avoid such inclement weather thereby greatly improving fuel economy, such as to 30 mpg. Based on the weather surrounding the vehicle 10, based on the weather data information received into the navigation ECU 52 and efficiency ECU 80, the fuel economy for selected routes may be calculated. Such fuel economy for selected routes may be known based on the speed limit(s) along the route and the topography of the route. When an average fuel economy for each of various routes are know, the best route may be selected or stored in the efficiency ECU 80 for use at a later time in conjunction with other information, as will now be explained.

Continuing with the TPMS ECU 14, as explained above, such tire pressure information may be used in conjunction with the above-presented weather information to improve fuel economy. The efficiency ECU 80 may also be able to present route options with particular kinds of weather in conjunction with the tire pressure currently in the tires. Stated differently, the fuel economy of the vehicle 10 may be different (better or worse) depending upon the type of weather that the vehicle, and tires with a certain tire pressure, must travel upon. For instance, tires that are below the target pressure may perform better or worse, in terms of fuel mileage, on for example, wet asphalt, light snow, etc.

Continuing, a vehicle 10 may undergo draws for electrical loads, such as producing spark for the spark plugs, lighting dash lights, turn signals, etc. In some cases, electrical loads may be relatively large for the alternator of the vehicle. Such large electrical loads 86 may include heated passenger seats, heater blower motors, air conditioning blower motors, engine cooling fans, CD and DVD entertainment systems for passengers, and an item plugged into an on-board DC electrical socket, such as a cooler or refrigerator. When an electrical load is detected, that is for example, above a predetermined number of amperes, such as 2 amps, a message could be communicated to the display 16, via the efficiency ECU 80. By communicating such a message to the display 16, the effect of the large electrical draw on fuel economy may educate the driver to turn off the electrical draw to improve the vehicle fuel economy. The effect of the electrical draw on fuel economy may be displayed before any action by the driver on the load, is taken. Furthermore, the effect of such electrical draw may be combined with other items affecting fuel economy, as mentioned above, to communicate a total effect on fuel economy to the driver.

Continuing, a vehicle 10 may be equipped with an oxygen sensor 88. Oxygen sensors measure the exhaust gas concentration of oxygen from the internal combustion engine of the vehicle 10. By monitoring the oxygen level using an oxygen sensor 88, information on oxygen concentration may be sent to the efficiency ECU 80 to notify the driver when the oxygen sensor 88 is not performing properly or simply not functioning. By ensuring that the oxygen sensor is functioning properly, the vehicle engine will undergo the best possible fuel economy and lowest possible exhaust emissions, which will also maintain the lowest $CO_2$ emissions. The oxygen concentration in the exhaust gas is directly related to how well or complete the fuel in the engine undergoes combustion. By maintaining proper combustion with the correct air/fuel ratio into the engine, and monitoring the oxygen in the exhaust, the highest fuel mileage may be achieved and the lowest amount of $CO_2$ per gallon of fuel combusted. Furthermore, the effect of monitoring the oxygen level may be combined with other items affecting fuel economy, as mentioned above, to communicate a total effect on fuel economy and $CO_2$ to the driver. Moreover, the driver of the vehicle may use the exhaust gas information as an early warning of an exhaust system problem.

Continuing, a vehicle 10 may be equipped with a mass airflow sensor 90. Mass airflow sensors measure or determine the mass of air entering an electronically fuel-injected engine. The air mass information is necessary for the engine control unit (ECU) to calculate and deliver the correct fuel mass to the engine because air changes its density as it expands and contracts with temperature and pressure. In an automotive application, air density varies with the ambient temperature and altitude, and this is an ideal application for a mass sensor. By monitoring the mass airflow using a mass airflow sensor 90, information pertaining to such may be sent to the efficiency ECU 80 to notify the driver when the mass airflow is deficient or not acceptable, such as for a given temperature or altitude given the demand on the engine as requested by the driver. The efficiency ECU 80, moreover, may recommend by way of the display, to check or replace the air filter based upon the readings of the mass airflow sensor 90. As an example, a recommendation to replace the air filter may be made when an insufficient volume of air flow is sensed by the mass airflow sensor 90. By ensuring that the mass airflow sensor 90 is functioning properly, the vehicle engine will undergo the best possible fuel economy and lowest possible exhaust emissions, which will also maintain the lowest $CO_2$ emissions. The mass airflow is directly related to how well or complete the fuel in the engine undergoes combustion. By maintaining proper combustion with the correct air/fuel ratio into the engine, and monitoring the mass airflow into the engine, the highest fuel mileage may be achieved and the lowest amount of $CO_2$ per gallon of fuel combusted. Furthermore, the effect of monitoring the mass airflow level may be combined with other items affecting fuel economy, as mentioned above, to communicate a total effect on fuel economy and $CO_2$ emissions to the driver.

The vehicle 10 may also be equipped with a brake ECU 92 that may be used to improve fuel economy and reduce $CO_2$ emissions. The brake ECU 92 may be used to monitor the speed of the vehicle and direct electricity generated during braking to electrical loads burdening the electrical grid of the vehicle. More specifically, electrical generators 122 assist in braking the car during braking when the car is a part of stop-and-go driving. As the driver applies the brakes through a conventional brake pedal, the electrical generators are permitted to rotate and generate electricity which is then distributed to the vehicle's electrical system or grid and lessen the load on the vehicle's alternator, which normally would generate electricity for the vehicle components. The torque created by rotation of the electrical generators counteracts the forward momentum and motion of the vehicle and eventually stops the vehicle or only slows the vehicle until the driver removes his or her foot from the brake pedal. In instances where the speed of the vehicle, even while slowing, is great enough to generate enough electricity to the vehicle, the alternator of the vehicle may be disengaged to lessen the burden on the internal combustion engine, which otherwise would expend energy, and thereby burn additional gasoline or diesel fuel, to power the alternator. Alternatively, the alternator may be equipped with a clutch that may be engaged and disengaged based on the amount of electrical energy being developed by the generators. More specifically, when the generators 122 are generating an amount of electricity that is sufficient to supply the electrical draw of the vehicle, then the engaged clutch of the alternator may be disengaged to lessen the load on the engine, which drives or rotates the alternator when the clutch is engaged. Continuing, the efficiency ECU or the brake ECU may record the braking distances for a specific driver each time the brakes are applied in a vehicle, and the calculate the average braking distance for that specific driver. With the braking distances known and the average braking distance known, a longer braking distance may be recommended for any specific driver. Longer braking distances will enable additional electricity to be generated compared to a shorter braking distance. Each driver of a vehicle may be identified with a code that may be entered into the navigation system screen and stored in the navigation system ECU 52 and/or the efficiency ECU 80.

The vehicle 10 may also be equipped with a load balancing ECU 94 that may be used to improve fuel economy and reduce $CO_2$ emissions from the vehicle as the vehicle 10 travels along a road. More specifically, the load balancing ECU 94 may communicate with four load balancers 106, 108, 110, 112, which themselves may be either hydraulically or electrically controlled devices each having the capability to raise and lower its corner of the vehicle when instructed to by the load balancing ECU 94. The load balancers 106, 108, 110, 112 may be a device separate from the strut or shock absorbing device of each wheel and may be tuned or configured to maintain the vehicle body position, relative to each wheel, in a position that is most advantageous to vehicle fuel economy. For example, the position of the vehicle to achieve the highest fuel economy may be the position of the vehicle 10, relative to the ground upon which the vehicle sits, when the vehicle is not burdened with a weight load, such as passengers or objects, which may be stored in the passenger compartment or a storage compartment. Continuing, when weight due to a passenger or other object is placed into the vehicle, the suspension of the vehicle may react by lowering the height of the vehicle or raising the height of the vehicle. For instance, if 250 lbs. (about 113 kilograms) is placed into the trunk or rear storage compartment of the vehicle, the rear of the vehicle will move lower to the ground while the front end of the vehicle may actually move farther away from the ground in response to the weight in the rear of the vehicle 10. The load balancers 106, 108, 110, 112 may each be equipped with a sensor to sense a change in position of the balancer. In one scenario, load balancers 106, 108, 110, 112 would have to sense the change in vehicle height or suspension extension or compression for at least a predetermined amount of time, such as 10 seconds, before the load balancers 106, 108, 110, 112 would react and adjust the vehicle suspension back to pre-load positions. Such may prevent constant adjustments every time the position of the vehicle height changes relative to the ground, such as when the vehicle is traveling along a road with many ups and downs, or curves. Continuing, the efficiency ECU 80 may use the load balancers 106, 108, 110, 112 to calculate the load, such as the weight of the cargo and passengers, in the vehicle and provide an estimate of how much the efficiency may be improved if the load is reduced. Still yet, the efficiency ECU 80 may also record the length of time that a certain load has been in the vehicle and recommend to a user, via the display screen 16, that the load be reexamined or reconsidered as to its necessity. In the event that a load in the vehicle is no longer necessary, the load may be removed thereby increasing the vehicle efficiency (fuel mileage, aerodynamics, etc.). Similarly, when a load, such as golf clubs, is placed into a vehicle, a time for which the load should remain in the vehicle may be typed or programmed into the efficiency ECU 80, via the display 16, so that the efficiency ECU 80 may alert the driver when the load should be removed. In other words, a date and time may be displayed on the display 16 to alert the driver when to remove the load or at least prompt the driver for the option of removing the load.

The vehicle may also be equipped with a cluster 96, also known as an instrument panel 56. The cluster 96 or instrument panel 56 may be a display to display fuel economies, $CO_2$ emissions, etc.

The vehicle 10 may also be equipped with a transmission ECU 98, which may be used to improve the fuel economy of the vehicle 10 and also its $CO_2$ emissions by informing the driver of the vehicle when to shift the gears in the transmission. More specifically, when the vehicle is equipped with a manual transmission, the transmission ECU 98 may communicate with the efficiency ECU 80 to instruct the vehicle driver, via the display 16, to shift the vehicle to a higher or lower gear. The instruction or suggestion to the driver to shift to a different gear may be governed by the speed of the vehicle and the speed (RPM) of the engine so that a vehicle is not held in any particular transmission gear for a time past its acceleration limit, which is the engine rpm at which shifting to another gear (for example from $3^{rd}$ gear to $4^{th}$ gear) is economical from the perspective of fuel economy. Stated differently, when the vehicle driver is notified by a shift indicator light, controlled by a transmission ECU 98, the driver will know to shift a manual transmission to a higher gear thereby preventing over-acceleration in the lower gear (the gear before shifting to the higher gear). The shift light may also be used with an automatic transmission to indicate to the driver when to permit the automatic transmission to shift to a higher gear. To do such, the driver normally needs only to stop or to slow acceleration by pressing on the accelerator pedal to a lesser extent, essentially "easing up" on the accelerator pedal to decrease the amount of fuel flowing to the engine 105. The effect of monitoring the most advantageous time to shift transmission gears may be combined with other items affecting fuel economy, as discussed above, to communicate a total effect on fuel economy and $CO_2$ emissions to the driver using the efficiency ECU 80 and the display 16.

The vehicle 10 may also be equipped with an air conditioning compressor 100 and an air conditioning evaporator 101 which may be monitored by the efficiency ECU 80. By monitoring the temperature of the evaporator 101 and output of the A/C compressor 100, the fuel economy of the vehicle 10 may be maximized and the $CO_2$ emissions may be minimized. More specifically, when a vehicle operator uses the A/C controls 109 to obtain maximum cooling in the passenger compartment 111 of the vehicle 10, the A/C compressor 100 may immediately begin compressing at its maximum displacement; however, when the evaporator 101 reaches its maximum amount of cooling capacity, which may correspond with the lowest achievable temperature of the evaporator 101, the efficiency ECU 80 may begin to either decrease the speed of the compressor 100, turn the compressor off until the evaporator temperature is lowered by a predetermined temperature, such as three degrees for example, or in the case of a variable displacement compressor, to change the displacement of the compressor 100. Continuing, by changing the displacement of the compressor, that is, by decreasing the displacement of the compressor, the maximum cooling capacity of the evaporator 101 may be able to be maintained without utilizing the full compressor displacement. Such may be the case when the cooling or compressing capacity of the compressor exceeds the cooling capacity of the evaporator 101. Stated differently, further compression by the compressor 100 may not cool or decrease the temperature of the evaporator 101 to a further degree. When the efficiency ECU 80 is able to control the compressor 100 as described above, the fuel economy of the vehicle may increase and the $CO_2$ output may then decrease. The effect of monitoring the evaporator temperature and compression by the compressor may be combined with other items affecting fuel economy, as discussed above, to communicate a total effect on fuel economy and $CO_2$ emissions to the driver using the efficiency ECU 80 and the display 16. The driver may then decide and choose to permit the compressor to change its displacement or be turned off for a certain period of time. The effect on fuel economy and CO2 emissions may be displayed on the display 16 before the selection by the driver. Another feature that may be utilized in conjunction with the vehicle air conditioner or compressor, the driver may set the interior temperature of the vehicle passenger compartment 111 to be 60 degrees Fahrenheit and the efficiency ECU may return a suggestion of 72 degrees Fahrenheit on the display 16. Additionally, the benefits of selecting a warmer temperature, thus reducing the use on the vehicle air conditioner, may also be displayed on the display 16. The benefits may be determined by actually testing the vehicle with its air conditioner set to different temperatures against a range of ambient outside temperatures and measuring the fuel economy and $CO_2$ emissions, for example. Still yet, the data may be graphically extrapolated to determine fuel economy, $CO_2$ emissions, etc. and the difference in benefit between different air conditioner temperature settings.

The vehicle 10 may also be equipped with an alternator ECU 102 which may be monitored by and in communication with the efficiency ECU 80. The fuel economy of the vehicle 10 may be maximized and the $CO_2$ emissions may be minimized when the electrical output of the vehicle alternator is minimized, which may be accomplished by minimizing the electrical draw on the alternator. Therefore, when the electrical output of the alternator, as monitored by the alternator ECU 102 and communicated to the efficiency ECU 80, meets a certain threshold in amperes, the display 16 may indicate such to the vehicle driver and prompt the driver to turn off electrical loads on the alternator. Examples of electrical loads may be, but are not limited to, on-board entertainment systems, fan motors for a heater blower or air conditioning blower, an on-board beverage cooler, engine cooling fans, etc. The effect of monitoring the alternator by the alternator ECU 102 may be combined with other items affecting fuel economy, as discussed above, to communicate a total effect on fuel economy and $CO_2$ emissions to the driver using the efficiency ECU 80 and the display 16. The driver may then decide and choose to turn off certain electrical loads to improve fuel economy and limit $CO_2$ emissions. The effect on fuel economy and $CO_2$ emissions with respect to individual components may be displayed on the display 16 for selection by the driver to deactivate such devices. If the user turns off or deactivates all loads and the current fuel economy and CO2 emission readings remain high, (such as the same as when loads were active) the user will then become aware of a problem.

The vehicle 10 may also be equipped with an engine ECU 104 which may be monitored by and in communication with the efficiency ECU 80. More specifically, the fuel economy of the vehicle 10 may be further maximized by the engine ECU 104 which monitors and controls multiple engine ECU parameters of an internal combustion engine. For instance, the engine ECU 104 may control parameters such as the quantity of fuel injected into each combustion cylinder, the ignition timing for each cylinder, the variable valve timing (VVT), the level of boost maintained by a turbocharger for vehicles so equipped, and other parameters. The quantity of fuel, ignition timing and other parameters may be arrived at using sensors such as a MAP (manifold absolute pressure) sensor, throttle position sensor, air temperature sensor, oxygen sensor and many others, in conjunction with a PID (proportional-integral-derivative) based control logic. For an engine with fuel injection, the engine ECU 104 will determine the quantity of fuel to inject based on a number of parameters. For instance, if the accelerator or throttle pedal is steadily depressed the throttle body will open and allow an increasing amount of air to be pulled into the engine 105. The engine ECU 104 will then inject more fuel according to how much air is passing into the engine 105. In some instances, if the engine has not warmed up yet, more fuel may be injected into the combustion chambers causing the engine to run slightly 'rich' until the engine warms up. An ECU can adjust the exact timing of the spark (ignition timing) to provide optimum power and economy. If the engine ECU 104 detects knock, a condition which is potentially destructive to engines, and "judges" it to be the result of the ignition timing being too early in the compression stroke, the engine ECU 104 will delay (retard) the timing of the spark to prevent such knocking. In an engine with variable valve timing, the engine ECU controls the time in the engine cycle at which the valves open. The valves may be opened later at higher speeds than at lower speeds. Such valve timing may optimize the flow of air into the cylinders, thereby increasing power and fuel economy. When the efficiency ECU 80 is able to affect control over the engine ECU 104, the fuel economy of the vehicle may increase and the $CO_2$ output may then decrease. By affecting control over the engine ECU 104, the efficiency ECU 80 may send a message to the display asking, for instance, whether the fuel mixture should be made richer in times of initial engine starting, such as when the weather is below a predetermined temperature. By permitting the driver to set the temperature at which additional fuel will be injected into the combustion chamber during initial engine starting, fuel may be conserved over standard starting programming. The effect of monitoring or controlling the engine ECU 104 may be combined with other items affecting fuel economy, as discussed above, to communicate a total effect on fuel economy and $CO_2$ emissions to the driver using the efficiency ECU 80 and the display 16. The driver may then decide and choose to permit the engine ECU 104 to change its control. The effect on fuel economy and $CO_2$ emissions may be displayed on the display 16 before such selection by the driver.

The Controller Area Network or CAN bus automotive network may be used to achieve communication between devices and components with which the efficiency ECU 80 communicates.

What is described then is a method of optimizing fuel economy of a vehicle 10 by utilizing an efficiency ECU 80. More specifically, the method may entail reading a real-time tire pressure into the efficiency ECU. The real-time tire pressure may be for any number of tires on the vehicle 10. The method may further entail reading real-time electrical loads into the efficiency ECU. The electrical loads may be any electrical load of the vehicle, including relatively large electrical loads such as an on-board entertainment system with a DVD player and one or more accompanying LCD screens. Other examples may include an on-board DC power outlet that may be powering a device such as a beverage cooler or beverage heater, factory installed power seats, fog lights, etc. The method may further entail displaying the real-time tire pressure(s) and the real-time electrical loads on a driver-readable display, such as a navigation system display 16 within the vehicle. The method may also include displaying the fuel economy and carbon dioxide emissions of the vehicle upon driver selection of specific tire pressure and specific electrical loads. That is, the driver may view on the display 16, all electrical loads, electrical loads above a predetermined amperage, or electrical loads that may be qualified as non-essential electrical loads, such as the entertainment system and beverage cooler and beverage heater described above.

The efficiency ECU 80 will communicate the electrical loads 86 and the one or more real-time tire pressures to the display 16. The efficiency ECU 80 will also display the correct tire pressure for each tire as recommended by the tire or vehicle manufacturer. The efficiency ECU 80 will also display the fuel economy of the vehicle 10 for the real-time tire pressure(s) and the correct tire pressure(s). This will enable a driver to actually see the difference in fuel economy of the vehicle 10 with the real-time and correct tire pressures and perhaps influence the decision to adjust the tire pressure(s) to the correct pressure. Additionally, the $CO_2$ emissions will also be displayed, that is, with the real-time and the correct tire pressures. The effect on fuel economy and $CO_2$ emissions of the various electrical loads and the real-time and correct tire pressures of the vehicle may be known from testing done with the vehicle utilizing the various loads and tire pressures. Alternatively, the effect on fuel economy may be calculated. The storage of any fuel economy information may be stored in the efficiency ECU 80.

The method may also entail reading a real-time oxygen level from an oxygen sensor into the efficiency ECU 80 and displaying the fuel economy of the vehicle with the vehicle utilizing the installed, current oxygen sensor and also a new or correctly working oxygen sensor. The driver may see the improvement in fuel economy and $CO_2$ emissions upon each economy being displayed. The oxygen sensor may be similar to those known in the art, such as those installed in vehicle exhaust systems.

The method may further entail first reading weather information into the efficiency ECU 80 such that the weather information pertains to more than one road route and then displaying a fuel economy of the vehicle upon driver selection of a displayed road route. The displayed road route(s) may be displayed on the screen of the navigation system or on a separate display. In either event, the efficiency ECU 80 may have fuel economies programmed into it that take into consideration the weather of each route. For instance, weather that is particularly hot and humid (e.g. 90 degrees Fahrenheit and 95% relative humidity) may effect fuel economy differently than weather that is wintry (e.g. 10 degrees Fahrenheit and 10% relative humidity). Such performance characteristics may be programmed into the efficiency ECU 80 and taken into consideration when fuel economy is displayed. The efficiency ECU 80 may also take into consideration, via programming and/or reading from stored data, the fuel economy for particular elevations since the density of air may have an effect on fuel economy and also $CO_2$ emissions.

The method may further entail reading a plurality of traffic conditions into the efficiency ECU 80 such that each traffic condition corresponds to a specific road route, and displaying a fuel economy of the vehicle for each road route. Road routes that are congested may offer poorer fuel economy compared to road routes that are not congested with traffic, such as routes upon which traffic is moving at the speed limit. Traffic conditions may be sent from satellites or cell phone towers which may communicate with the navigation system 52 and then the efficiency ECU 80 or directly into the efficiency ECU 80 within the vehicle 10. Continuing, the navigation system ECU 52 may store information including the speed limits for the roadways displayed on the navigation system display 16 and use such information to propose a particular route to achieve a higher fuel economy when multiple routes are possible. For instance, a vehicle may achieve a higher fuel economy on a road designated as 55 mph (88 km/h) compared to a road designated as 70 mph (112 km/h). Thus, the designated speed of a road may be taken into consideration, along with the other parameters already discussed or to be discussed later, when the efficiency ECU 80 computes the efficiency of a route. Moreover, the number of traffic lights on a roadway, and the length of time of each red light of each traffic light, may also be known by the navigation system ECU 52 and efficiency ECU 80 and taken into consideration when the efficiency ECU 80 calculates the most efficient route possible, taking into consideration $CO_2$ emissions, fuel economy, etc.

The method may further entail reading an alternator output into the efficiency ECU 80 and displaying such alternator output along with the fuel efficiency of the vehicle at the current alternator output. The display of the fuel economy at a particular alternator output may prompt a driver to reduce electrical loads of the vehicle, as discussed above, to improve fuel economy. The fuel efficiency of the vehicle at particular alternator outputs may be stored in the efficiency ECU 80 and be displayed on the display 16. A driver may select a different (e.g. lower) alternator amperage output as a touch feature of the screen to view improved fuel efficiency scenarios. Moreover, the efficiency ECU 80 may be programmed or configured to cause each electrical load (vehicle devices) of the vehicle to display the amount of current (amperes) that is being consumed by the device, or an energy factor that is related to current draw or indicates or correlates with the current consumption of the devices. By actually displaying the various devices and the amount of electrical energy consumed by the devices, a driver may selectively eliminate (turn off) electrical loads that impact fuel economy. The devices may be any device that draws electrical energy from the vehicle battery or alternator.

The method may further entail reading an air conditioning evaporator temperature into the efficiency ECU 80 and displaying the evaporator temperature on the display 16. The fuel economy of the vehicle for each of a plurality of lesser air conditioning compressor displacements on the display. The evaporator temperature may be measured by a thermo couple, thermistor, or other temperature measuring device. Because the air conditioning compressor may be a variable displacement compressor, the displacement may be know at any particular time. The temperature of the evaporator and the displacement of the compressor may be read into the efficiency ECU 80 and the display may then display the fuel economy for such displacement of the compressor, as it is known that functioning air conditioning compressors may decrease vehicle fuel efficiency. Such fuel efficiency for the vehicle 10 for a variety of compressor displacements may be known from actual testing. The efficiency ECU 80 in conjunction with the display 16, may display a variety of less compressor displacements, some that may correspond to the same evaporator temperature as a higher displacement. The reason that a variety of compressor displacements may all correspond to the same evaporator temperature is that the compressor may be overdesigned for the evaporator, or stated differently, only a relatively small compressor displacement may be necessary to arrive at the cooling capacity of the evaporator. By selecting a different (lesser or lower) compressor displacement corresponding to the same evaporator temperature, the fuel economy of the vehicle 10 may be improved; such improvements may be displayed on the display 16.

While the compressor displacement may be adjusted to improve fuel economy, the speed of the compressor 100 may be adjusted. By compressing at a lower frequency (rpm), energy and work by the engine 105 will be conserved, thereby improving fuel economy. The compressor speed, (e.g. rotations per minute or rpm) may be displayed on the display 16, so that such speed may be selected by a driver in hopes of a desire to increase fuel economy and decrease $CO_2$ emissions. Similar to compressor displacement, different compressor speeds may result in the same evaporator temperature.

Still yet, the teachings of the present invention may be used in conjunction with a mass airflow ("MAF") sensor, which measures the amount of intake air flowing into the engine 105. More specifically, the method may entail reading a real-time mass airflow rate into the efficiency ECU 80 and the displaying a fuel economy of the vehicle on the display 16 for the real-time mass air flow rate. Additionally, the vehicle fuel economy may also be displayed for the correct or expected mass airflow rate. By permitting a driver to actually see the improved fuel economy in a side-by-side comparison of the two MAF sensor devices, the driver may opt to change the MAF sensor. The fuel economy for decreased airflow rates and the expected or correct airflow rates may be obtained from experimental testing and stored in the efficiency ECU 80.

The method may further entail reading a real-time transmission gear position from a transmission ECU 98 and into the efficiency ECU 80, and displaying a fuel economy of the vehicle 10 based upon the real-time transmission gear position and the fuel economy for different transmission gear positions. Known in the art are mile per gallon ("MPG") calculators that perform real-time calculations for a vehicle as it travels along a road. The teachings of the present invention would display the fuel economy for each gear of the vehicle at the current speed that would result in improved fuel economy. By displaying more economical gear options with the economy achievable to the driver, in addition to the current fuel economy of the current gear, the driver may desire to shift to the more economical gear.

The method may further entail reading real-time positions of a number of load balancers into the efficiency ECU 80 and displaying a fuel economy of the vehicle based upon the real-time positions of the plurality of load balancers and for a vehicle no load position. The load balancers 106, 108, 110, 112 may be shock absorbers, such as air-adjustable shock absorbers, that may adjust the position of the vehicle or vehicle body, relative to the road. More specifically, the load balancers 106, 108, 110, 112 are set at a particular height or setting that can be considered the "no load" height or setting. When a load is placed into the vehicle 10, the suspension of the vehicle 10 will accommodate the load, as is known in the art. The load balancers 106, 108, 110, 112 may then be made to readjust the suspension of the vehicle to restore the vehicle suspension to its pre-load or no-load setting. The load balancers 106, 108, 110, 112 may communicate with the efficiency ECU 80 to indicate that their position from the no-load position has occurred. Because the position of the vehicle or vehicle body, as it moves through air, affects the fuel economy of the vehicle 10, the efficiency ECU will display the real-time, loaded, vehicle fuel economy and the fuel economy for the no-load position. Be actually being able to view the two fuel economies, the vehicle driver is able to select the best vehicle economy, which may mean selecting the adjustment of the load balancers to the no-load position. Such adjustment may be made by an on-board air tank or air compressor.

The method may further entail reading real-time information from a brake ECU 92 into the efficiency ECU 80, directing rotational energy from the vehicle wheels 34, 36, 38, 40 to electrical generators 122 at the wheels, generating electrical energy with the electrical generators 122, supplying electricity to the electrical loads 86 of the vehicle 10, disengaging a vehicle alternator 120, and displaying, on the display 16, a fuel economy before generating electrical energy with the electrical generators 122 and a fuel economy after generating electrical energy with the electrical generators 122. By generating electrical energy on-board the vehicle 10 with electrical generators 122 at each wheel, for example, the electrical load on the alternator 120, and thus the load on combustion of the engine 105.

The method may further entail reading real-time engine ECU parameters into the efficiency ECU 80, and displaying a fuel economy of the vehicle 10 based upon the real-time engine ECU parameters and displaying a fuel economy of the vehicle 10 based upon proposed changes in the engine ECU parameters. The engine ECU parameters may include of a quantity of fuel injected into each combustion cylinder, ignition timing for combustion of each cylinder, and a level of boost maintained by a turbocharger. Other parameters are foreseeable. The current real-time parameter and proposed changes in parameters (such as turning it on or off or lessening or increasing its degree or effect on vehicle efficiency or economy), and their effect on fuel economy, may be displayed on the display 16 to permit driver selection of such parameters. Communications between the efficiency ECU 80 and other components in the vehicle 10, from which communications are necessary, may be made by wire, or may be wireless. Additionally, communications between any of the components within the vehicle 10, may be by wire, or wireless, where appropriate.

Thus, what has been described above is depicted in the flowchart of FIG. 6, which is a fuel efficiency improvement flowchart 124. In the flowchart, block 126 depicts reading a tire pressure into the efficiency ECU 80, block 128 depicts reading electrical loads into the efficiency ECU 80, block 130 depicts oxygen levels from an oxygen sensor in the exhaust system into the efficiency ECU 80, block 132 depicts reading mass air flow rates from an engine intake into the efficiency ECU 80, block 134 depicts reading brake ECU 92 information into the efficiency ECU 80, block 136 depicts reading load balancing ECU information into the efficiency ECU 80, block 138 depicts reading transmission ECU information into the efficiency ECU 80, block 140 depicts reading an air conditioning evaporator temperature into the efficiency ECU 80, block 142 depicts reading alternator output (current or amperes) into the efficiency ECU 80, block 144 depicts reading engine ECU information into the efficiency ECU 80, block 146 depicts reading weather data for various user-selected road routes and traffic conditions for user selected road routes into the efficiency ECU 80, block 148 depicts displaying on the display 16, information that is read into the efficiency ECU 80, block 150 depicts the efficiency ECU 80 providing the vehicle driver with options for improving fuel economy and reducing $CO_2$ emissions. Such options are the correct, preferred or recommended settings, routes, etc. that correspond to the actual or real-time setting or situation being experienced by the driver. Block 152 depicts selecting such options on the display 16, as discussed and presented above, to the vehicle driver. Block 154 returns control to block 126.

Still yet, a method of optimizing the fuel economy of a vehicle 10 equipped with a navigation system 52 may entail a method such as providing a plurality of energy consuming devices in the vehicle. Such energy consuming devices in the vehicle may consist of those items depicted or listed in FIGS. 1-6, and the corresponding discussions of such devices above. Continuing, the method may entail monitoring energy consumption (amperes and the corresponding effect on vehicle fuel economy) of each of the energy consuming devices in the vehicle, displaying a quantity of energy consumption (such as in terms of electricity or effect on vehicle fuel economy, such as mph or km/h) of each of the energy consuming devices on a display 16 in the vehicle 10 and providing, on the display 16, an option to reduce the quantity of energy consumption (electricity, for example) of each (one or more) of the energy consuming devices in the vehicle (such as by turning the device off or lessening its energy consumption, such as by reducing the speed of a fan blower motor), selecting a destination using the navigation system 52, displaying a plurality of road routes to the destination on the display 16 in the vehicle 10, and displaying a quantity of fuel consumption, such as gallons or liters of fuel to be consumed, for each of the routes to the destination.

There are numerous advantages to the present teachings. An advantage of the present teachings is that a driver may visualize, on the display 16, a current or real-time (actual) operating situation of the vehicle, as discussed above, such as tire pressure, electrical loads, vehicle position due to loading, transmission gear, etc. and a correct or preferred operating situation such as a recommended tire pressure, vehicle position, transmission gear, etc. and actually view the difference in fuel economy and $CO_2$ emissions between the current (actual) and recommended or other possible operating situations regarding the item at issue (transmission gear, tire pressure, etc., as discussed above). Another advantage is that a driver may select a destination and corresponding road route ahead of time, receive a weather report for such road routes and corresponding fuel economy for such a route, and select a route before or even during a road trip to select or change his or her road route to conserve gasoline and limit $CO_2$ emissions.

What is claimed is:

1. A method of optimizing fuel economy of a vehicle by utilizing an efficiency ECU, the method comprising:
   reading a real-time tire pressure into the efficiency ECU;
   reading real-time electrical loads into the efficiency ECU;
   displaying the real-time tire pressure and the real-time electrical loads on a driver-readable display within the vehicle; and
   displaying a fuel economy and carbon dioxide emissions of the vehicle upon driver selection of tire pressure and electrical loads.

2. The method of claim 1, further comprising:
   reading a real-time oxygen level from an oxygen sensor into the efficiency ECU; and
   displaying a fuel economy of the vehicle upon driver selection of a new oxygen sensor, selected from the display.

3. The method of claim 1, further comprising:
   reading weather information into the efficiency ECU, wherein the weather information pertains to more than one road route; and
   displaying a fuel economy of the vehicle upon driver selection of a road route.

4. The method of claim 1, further comprising:
   reading a plurality of traffic conditions into the efficiency ECU, wherein each traffic condition corresponds to a specific road route; and
   displaying a fuel economy of the vehicle upon driver selection of a road route.

5. The method of claim 1, further comprising:
   reading an alternator output into the efficiency ECU; and
   displaying a fuel economy of the vehicle upon driver selection of a road route.

6. The method of claim 1, further comprising:
   reading an air conditioning evaporator temperature into the efficiency ECU; and
   displaying a fuel economy of the vehicle for each of a plurality of lesser air conditioning compressor displacements on the display, each displacement corresponding to the same evaporator temperature.

7. The method of claim 1, further comprising:
   reading an air conditioning evaporator temperature into the efficiency ECU; and
   displaying a fuel economy of the vehicle for each of a plurality of lesser air conditioning compressor speeds on the display, each speed corresponding to the same evaporator temperature.

8. The method of claim 1, further comprising:
   reading a real-time mass air flow rate into the efficiency ECU; and
   displaying a fuel economy of the vehicle for the real-time mass air flow rate and for a correct mass air flow rate.

9. The method of claim 1, further comprising:
   reading a real-time transmission gear position from a transmission ECU and into the efficiency ECU; and
   displaying a fuel economy of the vehicle based upon the real-time transmission gear position and for different transmission gear positions.

10. The method of claim 1, further comprising:
    reading real-time positions of a plurality of load balancers into the efficiency ECU; and
    displaying a fuel economy of the vehicle based upon the real-time positions of the plurality of load balancers and for a vehicle no load position.

11. The method of claim 1, further comprising:
    reading real-time information from a brake ECU into the efficiency ECU;
    directing rotational energy from vehicle wheels to electrical generators;
    generating electrical energy with the electrical generators;
    supplying electricity to the electrical loads of the vehicle;
    disengaging a vehicle alternator; and
    displaying, on the display, a fuel economy before generating electrical energy with the electrical generators and a fuel economy after generating electrical energy with the electrical generators.

12. The method of claim 1, further comprising:
    reading real-time engine ECU parameters into the efficiency ECU; and displaying a fuel economy of the vehicle based upon the real-time engine ECU parameters and displaying a fuel economy of the vehicle based upon proposed changes in the engine ECU parameters, wherein the engine ECU parameters consist of a quantity of fuel injected into each combustion cylinder, an ignition timing for each cylinder, and a level of boost maintained by a turbocharger.

13. A method of optimizing fuel economy of a vehicle by utilizing an efficiency ECU and a display within the vehicle, the method comprising:
reading a real-time tire pressure into the efficiency ECU;
reading a plurality of real-time weather conditions into the efficiency ECU corresponding to a plurality of user-selected road routes to a destination;
displaying the real-time tire pressure and corresponding fuel economy on the display;
displaying the plurality of real-time weather conditions for the plurality of road routes to the destination and corresponding fuel economies on the display;
displaying a fuel economy of the vehicle on the display using a manufacturer recommended tire pressure; and
providing user-selectable options on the display for a driver to select one of the plurality of road routes and its corresponding fuel economy, and to select the real-time tire pressure and its corresponding fuel economy and the fuel economy of the vehicle using the manufacturer recommended tire pressure to display the lowest possible combined fuel economy.

14. The method of claim 13, further comprising:
reading a plurality of real-time traffic conditions into the efficiency ECU corresponding to a plurality of road routes to the destination; and
displaying a fuel economy of the vehicle for each of the plurality of road routes.

15. The method of claim 13, further comprising:
reading a real-time electrical load into the efficiency ECU; and
displaying the electrical load on the display and an amount of fuel use attributed to the electrical load.

16. The method of claim 13, further comprising:
reading a real-time transmission gear position from a transmission ECU and into the efficiency ECU; and
displaying a fuel economy of the vehicle based upon the real-time transmission gear position and for different transmission gear positions at a current vehicle speed.

17. The method of claim 13, further comprising:
reading real-time positions of a plurality of load balancers into the efficiency ECU;
displaying a fuel economy of the vehicle based upon the real-time positions of the plurality of load balancers and for no load positions of the balancers of the vehicle; and
providing a touch screen option to adjust the load balancers to their no load positions.

18. The method of claim 13, further comprising:
reading real-time information from a brake ECU into the efficiency ECU;
directing rotational energy from vehicle wheels to electrical generators;
generating electrical energy with the electrical generators;
supplying electricity to the electrical loads of the vehicle;
disengaging a vehicle alternator; and
displaying, on the display, a fuel economy before generating electrical energy with the electrical generators and a fuel economy after generating electrical energy with the electrical generators.

19. The method of claim 13, further comprising:
reading real-time engine ECU parameters into the efficiency ECU; and
displaying a fuel economy of the vehicle based upon the real-time engine ECU parameters and displaying a fuel economy of the vehicle based upon proposed changes in the engine ECU parameters, wherein the engine ECU parameters consist of a quantity of fuel injected into each combustion cylinder, an ignition timing for each cylinder, and a level of boost maintained by a turbocharger.

20. The method of claim 13, further comprising:
reading an air conditioning evaporator temperature into the efficiency ECU; and
displaying a fuel economy of the vehicle for each of a plurality of lesser air conditioning compressor displacements on the display, each displacement corresponding to the same evaporator temperature.

21. A method of optimizing fuel economy of a vehicle equipped with a navigation system in combination with at least two energy consuming devices, the method comprising:
providing the at least two energy consuming devices in the vehicle;
monitoring energy consumption of each of the at least two energy consuming devices in the vehicle;
displaying a quantity of energy consumption of both of the energy consuming devices on a display in the vehicle; and
providing, on the display, an option to reduce the quantity of energy consumption of both of the energy consuming devices in the vehicle.

22. The method of claim 21, further comprising:
selecting a destination using the navigation system;
displaying a plurality of routes to the destination on the display in the vehicle; and
displaying a quantity of fuel consumption for each of the routes to the destination.

23. A method of optimizing fuel economy of a vehicle by utilizing an efficiency ECU, the method comprising:
reading a real-time tire pressure into the efficiency ECU;
reading a real-time electrical load into the efficiency ECU;
displaying the real-time tire pressure and the real-time electrical load on a driver-readable display within the vehicle; and
displaying a fuel economy of the vehicle upon driver selection of tire pressure and electrical load.

24. A method of optimizing fuel economy of a vehicle by utilizing an efficiency ECU, the method comprising:
reading real-time electrical loads into the efficiency ECU;
displaying the real-time tire pressure and the real-time electrical loads on a driver-readable display within the vehicle; and
displaying a fuel economy of the vehicle upon driver selection of tire pressure and electrical loads.

* * * * *